(12) United States Patent
Sekiyama et al.

(10) Patent No.: US 8,576,057 B2
(45) Date of Patent: Nov. 5, 2013

(54) FUEL CONSUMPTION SAVING DRIVE SUPPORTING DEVICE

(75) Inventors: Hiroaki Sekiyama, Minato-ku (JP); Yoshihiro Oe, Kawasaki (JP)

(73) Assignee: Toyota Jidosha Kabushiki Kaisha, Aichi (JP)

( * ) Notice: Subject to any disclaimer, the term of this patent is extended or adjusted under 35 U.S.C. 154(b) by 748 days.

(21) Appl. No.: 12/521,084

(22) PCT Filed: Dec. 25, 2007

(86) PCT No.: PCT/JP2007/074856
§ 371 (c)(1),
(2), (4) Date: Jul. 23, 2009

(87) PCT Pub. No.: WO2008/078749
PCT Pub. Date: Jul. 3, 2008

(65) Prior Publication Data
US 2010/0090818 A1    Apr. 15, 2010

(30) Foreign Application Priority Data

Dec. 27, 2006  (JP) ................................ 2006-352006

(51) Int. Cl.
*B60Q 1/00* (2006.01)
*G06G 7/76* (2006.01)
*G01F 9/00* (2006.01)
*G01M 15/00* (2006.01)

(52) U.S. Cl.
USPC .................. 340/439; 701/123; 73/114.52

(58) Field of Classification Search
USPC ................................ 340/439, 459
See application file for complete search history.

(56) References Cited

U.S. PATENT DOCUMENTS

| 6,092,021 | A * | 7/2000 | Ehlbeck et al. | 701/123 |
| 6,975,217 | B2 * | 12/2005 | Endoh | 340/438 |
| 7,072,762 | B2 * | 7/2006 | Minami et al. | 701/123 |
| 7,454,962 | B2 * | 11/2008 | Nishiyama et al. | 73/114.52 |
| 7,532,974 | B2 * | 5/2009 | Sato et al. | 701/123 |
| 7,646,289 | B2 * | 1/2010 | Tamai et al. | 340/439 |
| 7,742,871 | B2 * | 6/2010 | Chen | 701/123 |
| 7,865,276 | B2 * | 1/2011 | Skaff et al. | 701/22 |
| 2002/0120374 | A1 * | 8/2002 | Douros et al. | 701/29 |
| 2004/0093264 | A1 * | 5/2004 | Shimizu | 705/13 |
| 2005/0096836 | A1 * | 5/2005 | Minami et al. | 701/123 |

FOREIGN PATENT DOCUMENTS

| CN | 1647127 A | 7/2005 |
| EP | 1780393 A1 * | 5/2007 |
| JP | 2001-108503 A | 4/2001 |

(Continued)

OTHER PUBLICATIONS

Chinese Office Action mailed Jul. 14, 2010 for corresponding Chinese Patent Application No. 200780048536.9.

*Primary Examiner* — Daniel Wu
*Assistant Examiner* — Mohamed Barakat
(74) *Attorney, Agent, or Firm* — Sughrue Mion, PLLC

(57) ABSTRACT

A fuel consumption saving drive supporting device which calculates a mileage of each driver and informs each driver of advice based on an increase or a decrease of the calculated mileage is disclosed. The fuel consumption saving drive supporting device extracts a drive operation of the driver or a drive condition of a vehicle of the driver for increasing the mileage, and informs the driver of the advice in the drive operation or the drive condition corresponding to the extracted drive operation or the extracted drive condition.

5 Claims, 6 Drawing Sheets

| DRIVE OPERATION EXTRACTED FROM DRIVING HISTORY | ADVICE |
|---|---|
| MILEAGE HAS BEEN DECREASED ON MOTOR HIGHWAY (SUDDEN ACCELERATION HAS FREQUENTLY PERFORMED) | MILEAGE IS INCREASED AT CONSTANT VELOCITY ON MOTOR HIGHWAY |
| POSITION SHIFT OPERATION HAS NOT BEEN PERFORMED (AUTOMATIC VEHICLE) | FUEL CONSUMPTION QUANTITY CAN BE SMALL AT N SHIFT WHILE STOPPING |
| PERIOD DRIVING AT LOW GEAR HAS BEEN LONG (MANUAL VEHICLE) (ENGINE REVOLUTIONS IS HIGH) | MILEAGE IS INCREASED AT ENGINE REVOLUTIONS OF NEAR XXX |
| ENGINE BRAKE HAS NOT BEEN USED | VELOCITY CAN BE EFFECTIVELY SLOW BY USING ENGINE BRAKE |
| RACING HAS FREQUENTLY BEEN PERFORMED | MILEAGE IS DECREASED AT FREQUENT RACING |
| SUDDEN ACCELERATION HAS FREQUENTLY BEEN PERFORMED | MILEAGE IS INCREASED AT MORE SLOWLY PRESSING ACCELERATOR |
| SUDDEN BRAKE HAS FREQUENTLY PERFORMED (PERFORMING SUDDEN BRAKE AT NOT EMERGENCY) | VELOCITY IS EFFICIENTLY DECREASED AT MORE SLOWLY PRESSING BRAKE |
| MILEAGE HAS BEEN INCREASED (ON GENERAL ROAD) | MILEAGE HAS BEEN INCREASED BECAUSE OF GOOD ACCELERATOR OPERATION |
| MILEAGE HAS BEEN INCREASED (ON MOTOR HIGHWAY) | MILEAGE HAS BEEN INCREASED BECAUSE OF CONSTANT VELOCITY DRIVE |
| MILEAGE HAS BEEN DECREASED (ON GENERAL ROAD) | MILEAGE HAS BEEN DECREASED BECAUSE OF TRAFFIC CONGESTION |
| MILEAGE HAS BEEN DECREASED (ON MOTOR HIGHWAY) | MILEAGE HAS BEEN DECREASED BECAUSE OF EXCESSIVE VELOCITY |
| DRIVE CONDITION DETECTED BY SENSOR | ADVICE |
| DRIVING WHILE LOADING HEAVY ARTICLE | MILEAGE IS INCREASED AT UNLOADING HEAVY ARTICLE |
| AIR CONDITIONER HAS BEEN OPERATED TOO MUCH (TEMPERATURE AND AIR VOLUME ARE NOT SUITABLE) | MILEAGE IS DECREASED BY OPERATING AIR CONDITIONER AT UNSUITABLE TEMPERATURE AND AIR VOLUME |
| ENGINE OIL HAS BEEN DETERIORATED | MILEAGE IS INCREASED BY CHANGING ENGINE OIL |
| AUTOMATIC OIL HAS BEEN DETERIORATED | MILEAGE IS INCREASED BY CHANGING AUTOMATIC OIL |
| AIR PRESSURE OF TIRE HAS BEEN DECREASED | MILEAGE IS INCREASED BY MAKING AIR PRESSURE SUITABLE VALUE |
| PERFORMANCE OF AIR CLEANER HAS BEEN DECREASED | MILEAGE IS INCREASED BY CHANGING AIR CLEANER |

(56) References Cited

FOREIGN PATENT DOCUMENTS

| | | | |
|---|---|---|---|
| JP | 2002-167000 A | | 6/2002 |
| JP | 2003-106209 A | | 4/2003 |
| JP | 2003-115065 A | | 4/2003 |
| JP | 2003-331380 A | | 11/2003 |
| JP | 2004-210086 A | | 7/2004 |
| JP | 2005-201190 A | | 7/2005 |
| JP | 2006-057484 A | | 3/2006 |
| JP | 2006-077665 A | | 3/2006 |
| JP | 2006-088820 A | | 4/2006 |
| JP | 2006-243856 A | | 9/2006 |
| JP | 2006243856 A | * | 9/2006 |

* cited by examiner

FIG.3

| DRIVE CONDITION ON GENERAL ROAD | | | | | | | | | |
|---|---|---|---|---|---|---|---|---|---|
| DRIVEN PERIOD | ACCELERATION | DISTANCE | FUEL CONSUMPTION QUANTITY | ACCELERATOR POSITION | SHIFT POSITION | ENGINE REVOLUTIONS | INCLINATION ANGLE OF ROAD | BRAKE |
| AA:BB TO CC:DD | α1_1 | L1_1 | Q1_1 | AC1_1 | D | R1_1 | δ1_1 | OFF |
| ... | α1_2 | L1_2 | Q1_2 | AC1_2 | D | R1_2 | δ1_1 | OFF |
| ... | α1_3 | ... | ... | ... | ... | ... | ... | ... |

FIG.5

| DRIVE OPERATION EXTRACTED FROM DRIVING HISTORY | ADVICE |
|---|---|
| | |
| MILEAGE HAS BEEN DECREASED ON MOTOR HIGHWAY (SUDDEN ACCELERATION HAS FREQUENTLY PERFORMED) | MILEAGE IS INCREASED AT CONSTANT VELOCITY ON MOTOR HIGHWAY |
| POSITION SHIFT OPERATION HAS NOT BEEN PERFORMED (AUTOMATIC VEHICLE) | FUEL CONSUMPTION QUANTITY CAN BE SMALL AT N SHIFT WHILE STOPPING |
| PERIOD DRIVING AT LOW GEAR HAS BEEN LONG (MANUAL VEHICLE) (ENGINE REVOLUTIONS IS HIGH) | MILEAGE IS INCREASED AT ENGINE REVOLUTIONS OF NEAR XXX |
| ENGINE BRAKE HAS NOT BEEN USED | VELOCITY CAN BE EFFECTIVELY SLOW BY USING ENGINE BRAKE |
| RACING HAS FREQUENTLY BEEN PERFORMED | MILEAGE IS DECREASED AT FREQUENT RACING |
| SUDDEN ACCELERATION HAS FREQUENTLY BEEN PERFORMED | MILEAGE IS INCREASED AT MORE SLOWLY PRESSING ACCELERATOR |
| SUDDEN BRAKE HAS FREQUENTLY PERFORMED (PERFORMING SUDDEN BRAKE AT NOT EMERGENCY) | VELOCITY IS EFFICIENTLY DECREASED AT MORE SLOWLY PRESSING BRAKE |
| MILEAGE HAS BEEN INCREASED (ON GENERAL ROAD) | MILEAGE HAS BEEN INCREASED BECAUSE OF GOOD ACCELERATOR OPERATION |
| MILEAGE HAS BEEN INCREASED (ON MOTOR HIGHWAY) | MILEAGE HAS BEEN INCREASED BECAUSE OF CONSTANT VELOCITY DRIVE |
| MILEAGE HAS BEEN DECREASED (ON GENERAL ROAD) | MILEAGE HAS BEEN DECREASED BECAUSE OF TRAFFIC CONGESTION |
| MILEAGE HAS BEEN DECREASED (ON MOTOR HIGHWAY) | MILEAGE HAS BEEN DECREASED BECAUSE OF EXCESSIVE VELOCITY |
| DRIVE CONDITION DETECTED BY SENSOR | ADVICE |
| DRIVING WHILE LOADING HEAVY ARTICLE | MILEAGE IS INCREASED AT UNLOADING HEAVY ARTICLE |
| AIR CONDITIONER HAS BEEN OPERATED TOO MUCH (TEMPERATURE AND AIR VOLUME ARE NOT SUITABLE) | MILEAGE IS DECREASED BY OPERATING AIR CONDITIONER AT UNSUITABLE TEMPERATURE AND AIR VOLUME |
| ENGINE OIL HAS BEEN DETERIORATED | MILEAGE IS INCREASED BY CHANGING ENGINE OIL |
| AUTOMATIC OIL HAS BEEN DETERIORATED | MILEAGE IS INCREASED BY CHANGING AUTOMATIC OIL |
| AIR PRESSURE OF TIRE HAS BEEN DECREASED | MILEAGE IS INCREASED BY MAKING AIR PRESSURE SUITABLE VALUE |
| PERFORMANCE OF AIR CLEANER HAS BEEN DECREASED | MILEAGE IS INCREASED BY CHANGING AIR CLEANER |

FUEL CONSUMPTION SAVING DRIVE SUPPORTING DEVICE

TECHNICAL FIELD

The present invention relates to a fuel consumption saving drive supporting device which informs a driver of advice for increasing a mileage.

BACKGROUND ART

A driver intends to economically drive a vehicle by considering fuel consumption (mileage) of the vehicle. Therefore, for example, at each time of supplying fuel to the vehicle, the mileage is calculated by using a driven distance and consumed fuel by resetting a trip meter of the vehicle. In order to easily calculate the mileage, a technology has been proposed in which the mileage is automatically displayed when the trip meter is reset (for example, see Patent Document 1).

However, by only automatically calculating the mileage, the driver cannot understand what drive operations cause to increase the mileage, and the automatic calculation of the mileage cannot be said to be sufficient to learn drive operations for increasing the mileage.

In addition, a technology has been proposed (for example, see Patent Document 2). In the technology, by comparing a mileage standard value of another vehicle with a mileage standard value of a user's own vehicle, when the mileage of the user's own vehicle has been decreased, the mileage decrease is displayed, and when drive operations for decreasing the mileage such as sudden acceleration and long idling time are detected, a warning is displayed. When the driver obtains the warning on the display, the driver understands what operations have decreased the mileage and can utilize the operations to increase the mileage afterward.

However, by only displaying the operations that cause to decrease the mileage, the driver does not sufficiently obtain what operations can increase the mileage. Consequently, it is insufficient to enable the driver to actively increase the mileage. In addition, it is well known that the sudden acceleration and the long idling time cause to decrease the mileage, and it is difficult for the driver to increase the mileage by only displaying such operations.

[Patent document 1] Japanese Patent Application Publication No. 2004-210086
[Patent document 2] Japanese Patent Application Publication No. 2001-108503

DISCLOSURE OF INVENTION

Problems to be Solved by the Invention

One object of the present invention is to solve one or more aforementioned problems and to provide a fuel consumption saving drive supporting device which allows a driver to obtain operations for increasing a mileage and allows the driver to perform operations suitable to increase the mileage.

Means for Solving the Problems

An aspect of the present invention provides a fuel consumption saving drive supporting device which calculates a mileage of each driver and informs each driver of advice based on an increase or a decrease of the calculated mileage. The fuel consumption saving drive supporting device extracts a drive operation of the driver or a drive condition of a vehicle of the driver for increasing the mileage, and informs the driver of the advice in the drive operation or the drive condition corresponding to the extracted drive operation or the extracted drive condition.

According to another aspect of the present invention, the driver can obtain what drive operation increases the mileage and can be psychologically influenced to maintain an operation to which a good evaluation has been given, and can further increase the mileage.

Advantageous Effect of the Invention

An embodiment of the present invention provides a fuel consumption saving drive supporting device which allows a driver to obtain an operation for increasing a mileage and influences the driver to perform an operation suitable to increase the mileage.

BRIEF DESCRIPTION OF THE DRAWINGS

FIG. 3 is a diagram showing an example of a driving history stored in a driving history DB;

FIG. 5 is a diagram showing examples of advice corresponding to drive operations of the driver and drive conditions of the vehicle.

EXPLANATION OF REFERENCES

Figure 1:
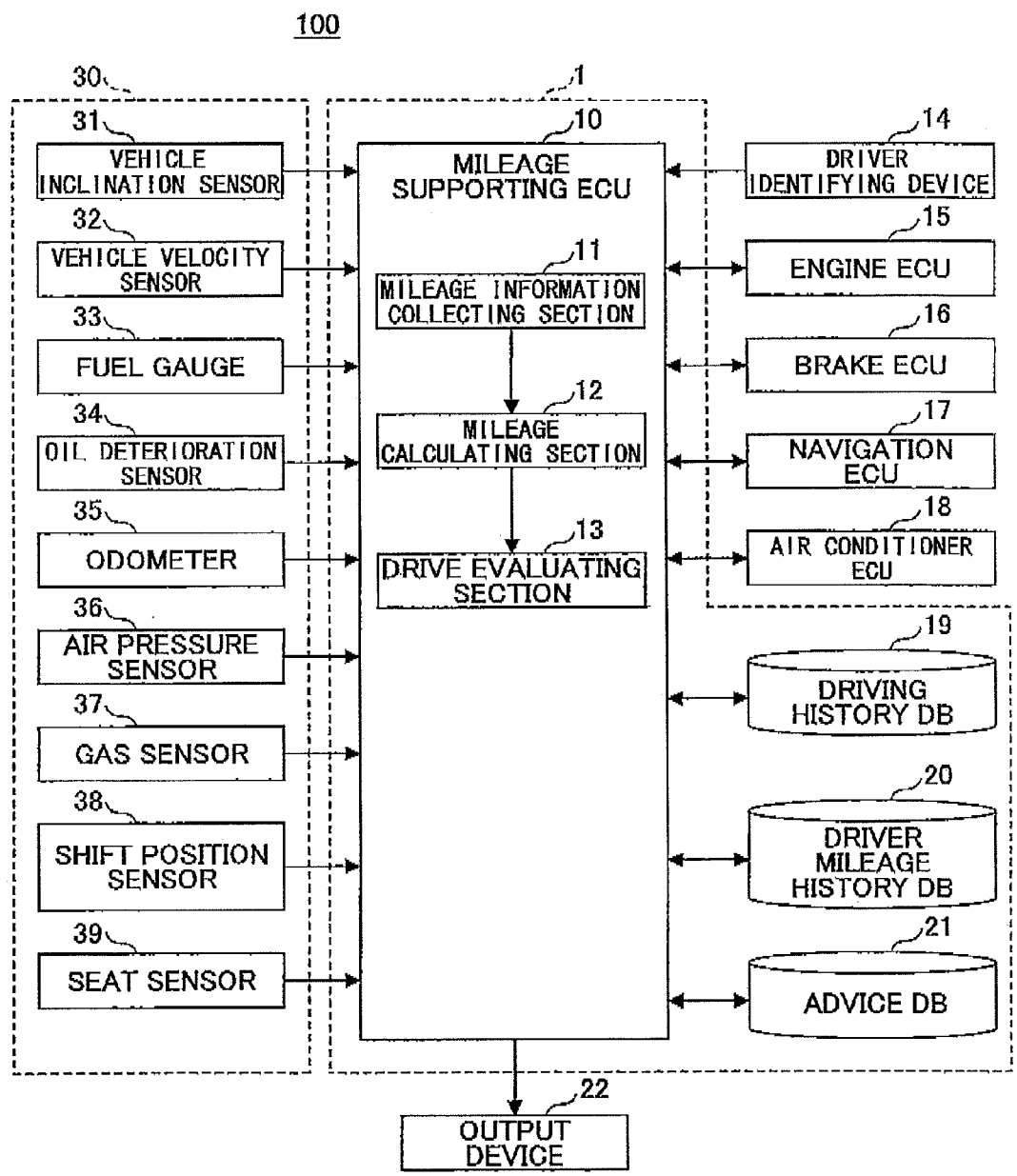
FIG. 1 is a diagram showing a functional structure of a fuel consumption saving drive supporting system including a fuel consumption saving drive supporting device according to an embodiment of the present invention.

1 Fuel consumption saving drive supporting device
10 Mileage supporting ECU
11 Mileage information collecting section
12 Mileage calculating section
13 Drive evaluating section
14 Driver identifying device
15 Engine ECU
16 Brake ECU
17 Navigation ECU
18 Air conditioner ECU
19 Driving history DB
20 Driver mileage history DB
21 Advice DB
22 Output Device
30 Sensors
100 On-vehicle device information detecting system

BEST MODE FOR CARRYING OUT THE INVENTION

The best mode for carrying out the invention is described with reference to the accompanying drawings.

FIG. 1 is a diagram showing a functional structure of a fuel consumption saving drive supporting system including a fuel consumption saving drive supporting device 1 according to an embodiment of the present invention. The fuel consumption saving drive supporting device 1 detects drive operations or drive conditions that influence a mileage (fuel consumption) of a vehicle, and gives advice to a driver to operate the vehicle suitable for increasing the mileage. The driver can obtain what operations are suitable to increase the mileage based on the advice, intends to maintain a drive operation having a good evaluation for increasing the mileage, and can improve the fuel consumption saving drive.

An on-vehicle device information detecting system 100 (fuel consumption saving drive supporting system) includes the fuel consumption saving drive supporting device 1, sensors 30 for calculating a mileage, a driver identifying device 14, an engine ECU (electrical control unit) 15, a brake ECU 16, a navigation ECU 17, an air conditioner ECU 18, and an output device 22. The fuel consumption saving drive supporting device 1 includes a mileage supporting ECU 10 for controlling the fuel consumption saving drive supporting device 1, a driving history DB (database) 19 for storing a driving history of a driver, a driver mileage history DB 20 for storing a mileage of the driver, and an advice DB 21 for storing advice to the driver.

In addition, the mileage supporting ECU 10 includes a mileage information collecting section 11, a mileage calculating section 12, and a drive evaluating section 13. The mileage information collecting section 11 collects mileage information for calculating the mileage by obtaining detection values from the sensors 30. The mileage calculating section 12 calculates a mileage from the mileage information collected by the mileage information collecting section 11. The drive evaluating section 13 evaluates the drive of the driver based on the calculated mileage and displays advice for the driver based on the evaluated result. A digital tachograph can substitute for a part of functions of the mileage information collecting section 11.

The mileage supporting ECU 10 is a microcomputer in which a CPU, a RAM, a ROM, an NV-RAM (non-volatile RAM), a communication section, and so on are connected via a bus. The mileage supporting ECU 10 can be used as any one of the engine ECU 15, the brake ECU 16, the navigation ECU 17, and the air conditioner ECU 18; or another ECU.

When the CPU executes programs stored in a memory (for example, the ROM), functions of the mileage information collecting section 11, the mileage calculating section 12, and the drive evaluating section 13 are realized. In addition, the driving history DB 19, the driver mileage history DB 20, and the advice DB 21 are formed in storage units such as a RAM, a flash memory, and an HDD (hard disk drive).

First, the sensors 30 are described. A vehicle inclination sensor 31 detects a gradient of a road surface, and in the present embodiment, detects at least an inclination angle of a vehicle body in the pitching direction (front-back direction) of the vehicle. As the vehicle inclination sensor 31, a sensor using a gyro mechanism or a sensor for electrically detecting a change of a surface level of a sealed liquid is used. In addition, the gradient of the road surface can be detected from map data based on a position of the vehicle detected by the navigation ECU 17.

A vehicle velocity sensor 32 detects a rotational velocity of each wheel at each predetermined sampling time. The vehicle velocity sensor 32 measures, for example, changes of magnetic fluxes as pulses when convex sections formed with a constant interval on a circumference of a rotor of each wheel of the vehicle pass through the circumference, and obtain the velocity of each wheel based on the number of passed pulses per unit time. The vehicle velocity can be obtained by multiplying the velocity of a tire by a circumference of the tire.

A fuel gauge 33 is an electronic fuel meter for obtaining a remaining amount of fuel. For example, when a mileage after a predetermined amount of fuel has been consumed is calculated or a mileage between supplying fuel time and next supplying fuel time is calculated, the fuel gauge 33 detects an amount of fuel to be supplied and fuel supplying timing.

An oil deterioration sensor 34 detects deterioration of engine oil. The oil deterioration sensor 34 detects the deterioration of the engine oil, mix of impurities in the engine oil, and so on by radiating near-infrared rays to the engine oil and measuring an absorbing amount of the near-infrared rays by the engine oil. In a case of an automatic vehicle, deterioration of automatic oil for an automatic mechanism is detected by a sensor similar to the oil deterioration sensor 34.

An odometer 35 accumulates a travel distance of a vehicle. For example, when a mileage in each predetermined distance is calculated, the travel distance output from the odometer 35 is utilized. The travel distance can be also obtained from the vehicle velocity sensor 32.

An air pressure sensor 36 detects air pressure of each tire. The air pressure sensor 36 detects air pressure, temperature, and so on of each tire and can transmit the measured results to the vehicle side with wireless communications. The air pressure sensor 36 includes a pressure signal transmitting circuit embedded in a tire wheel and a receiver formed in the vehicle side for receiving the pressure signal. It is preferable that the air pressure sensor 36 has a function to detect a bald degree of a tire.

A gas sensor 37 detects concentration of a specific gas such as a NOx in an exhaust gas emitted from an engine. A shift position sensor 38 detects shift positions of gears of a transmission such as D (drive gear position), 1 (first speed gear position), 2 (second speed gear position), N (neutral gear position), P (parking gear position), and so on.

A seat sensor 39 detects whether a person(s) sits on a seat of the vehicle, and more preferably detects weight of each sat person. The detected number of persons or the weight of the persons is used to correct the Mileage. In addition, the vehicle includes a vehicle height sensor (not shown) and detects a vehicle height corresponding to laden weight on the vehicle. For example, a vehicle height has been stored beforehand when a person does not sit on the seat of the vehicle, and when the vehicle height is low even if a person does not sit on the seat of the vehicle, the vehicle height sensor can detect that a relatively heavy load is on the vehicle.

The driver identifying device 14 identifies a driver when plural drivers use the vehicle. In a vehicle having a smart key system, a driver has been registered with an identification code of a smart key beforehand, and the driver is identified based on the identification code of the smart key which the driver has. In addition, as personal identification, well-known biometric information (face, fingerprint, iris, vein pattern, and so on) of a person can be used. When the driver is identified, a mileage of each driver can be calculated and suitable advice for increasing the mileage can be given to each driver.

The engine ECU 15 performs fundamental control of the engine such as fuel injection control, ignition timing control, and idle-speed control, and performs optimum engine control corresponding to an accelerator pressing down amount. The mileage information collecting section 12 obtains a fuel consumption amount while driving the vehicle by detecting an injection pulse width of a fuel injection signal to be output to a fuel injection valve. In addition, the engine ECU 15 detects cooling water temperature, lubrication oil temperature, and so on. Therefore, when the engine temperature is low or high and this temperature influences the mileage, the mileage information collecting section 11 detects the temperature.

The brake ECU 16 independently controls wheel cylinder pressure (to intensify, to reduce, or to maintain) of each wheel, and performs, for example, well-known ABS (anti-lock braking system) control, and traction control. Master cylinder pressure or an output from a stop lamp switch is connected to the brake ECU 16, and the mileage information collecting section 11 can detect at least whether the driver is pressing a brake pedal or not. The brake ECU 16 and the engine ECU 15 can make constant velocity driving and predecessor following driving possible by utilizing a radar which detects a distance between a user's own vehicle and a preceding vehicle, and by utilizing a camera which detects a lane dividing line (white line) of a road.

The user's own vehicle provides a car navigation system and a road map, and the navigation ECU 17 detects a current position of the user's own vehicle by using GPS (global positioning system), and obtains a position of the user's own vehicle on a map by further using an autonomous running method and a map matching method. The map of the car navigation system, or an image of a TV broadcasting system or a DVD (digital versatile disk) player is displayed on the output device 22 (described below in detail).

The air conditioner ECU 18 detects a temperature difference between the inside and the outside of the vehicle and the degree of sunshine when a person in the vehicle determines a desirable temperature, and controls temperature, an air volume, and an air outlet so that the temperature inside the vehicle maintains to be constant. The mileage information collecting section 11 detects the running time, the determined temperature, the air volume, and so on of an air conditioner detected from the air conditioner ECU 18.

The output device 22 includes a display such as a liquid crystal display, an organic EL (electroluminescent) display, and a HUD (head up display), and a speaker which outputs voices, music, and so on. A message of advice output from the drive evaluating section 13 is displayed on the output device 22 and/or the advice is output from the speaker as voices. In addition, an output from the TV broadcasting system, an output from the DVD player, a map output from the car navigation system are displayed on the output device 22 as an output of a multimedia system.

Figure 2:
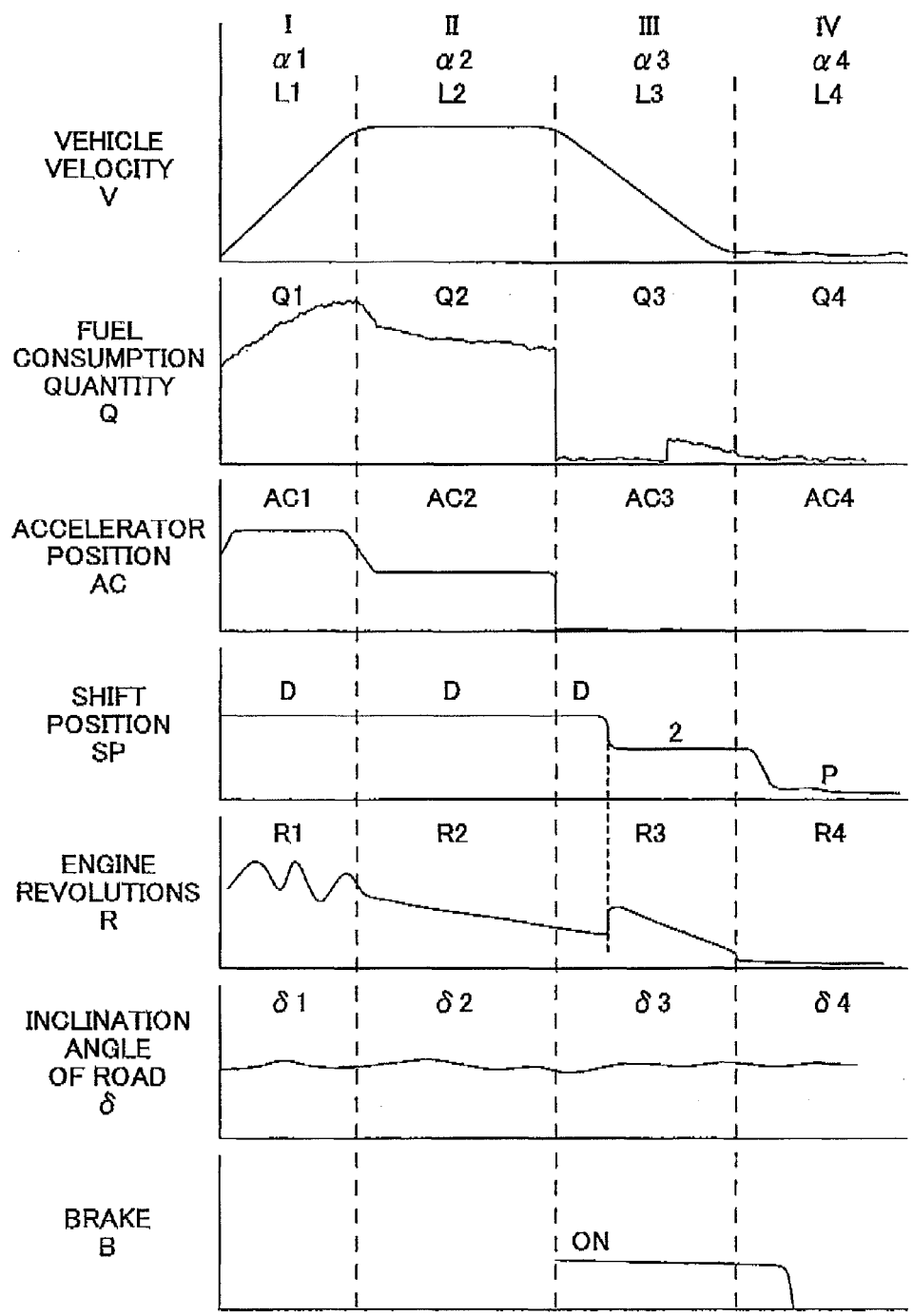
FIG. 2 is a diagram showing an example of information of a driving history between starting a vehicle and stopping the vehicle to be collected by a mileage information collecting section.

The mileage information collecting section 11 collects the information of the drive operations of the driver and the drive conditions of the vehicle, and stores the information in the driving history DB 19. FIG. 2 is a diagram showing an example of the information of the driving history between starting a vehicle and stopping the vehicle to be collected by the mileage information collecting section 11. In FIG. 2, the drive conditions are classified into four conditions. That is, in FIG. 2, I shows an accelerating condition, II shows a normal drive condition, III shows a decelerating condition, and IV shows a stopping condition.

The mileage information collecting section 11 determines whether the vehicle is in any one of the four conditions from a relationship between the vehicle velocity and the time, for example, in each predetermined cycle time or each predetermined interval of sampling time of the vehicle velocity. For example, when the vehicle velocity increases to a predetermined value or more, the condition is determined to be the accelerating condition; when the vehicle velocity change is within the predetermined value, the condition is determined to be the normal drive condition; when the vehicle velocity decreases to a predetermined value or less, the condition is determined to be the decelerating condition; and when the vehicle velocity is a predetermined value or less, the condition is determined to be the stopping condition.

It is well known that the mileage is largely different whether on a general road or on a motor highway. Therefore, when the mileage is calculated, it is preferable that each mileage on the general road and on the motor highway is individually calculated by determining whether the user drives the vehicle on the motor highway or not.

For example, the position information from the navigation ECU 17 can be used to determine whether the vehicle on the motor highway. Alternatively, when the vehicle is driving with a velocity more than a predetermined value for time more than a predetermined time value, it can be determined that the vehicle is driving on a motor highway. The above four drive conditions are individually applied to each on the general road and on the motor highway.

In addition, the mileage information collecting section 11 can calculate a driven distance by multiplying the vehicle velocity by the driven time. Therefore, driven distances L1 through L4 are calculated to be related to the corresponding four drive conditions. In addition, the mileage information collecting section 11 calculates fuel consumption amounts (quantities) based on the fuel injection pulse widths in the four drive conditions, and stores the calculated results to be related to the corresponding four drive conditions. In addition, in the four drive conditions, the mileage information collecting section 11 detects an accelerator position (pressing down degree of the accelerator), a shift position, engine revolutions, an inclination angle of a road, and stores the detected results to be related to each of the four drive conditions.

FIG. 3 is a diagram showing an example of a driving history stored in the driving history DB 19. In FIG. 3, a case of a general road is shown; however, a case of a motor highway can be stored in the driving history DB 19. The driving history can be stored in time series as shown in FIG. 2 by using the detected data as they are. However, when the detected data are digitized and are stored as shown in FIG. 3, the storing capacity can be decreased. In the example shown in FIG. 3, in each driven period, acceleration $\alpha 1\_i$, a distance $L1\_i$, an accelerator position $AC1\_i$, a shift position n (n is D, 1, 2, N, or P), engine revolutions an inclination angle of a road $\delta 1\_i$, and ON or OFF of a brake operation are stored in the driving history DB 19. In the above, a suffix is an identification number; however, when the driving history is identified by using the driven period, the suffix can be ignored.

The acceleration $\alpha$ is calculated from a velocity change per driven time. As the engine revolutions R, which are not constant in the drive condition, a representative value such as an average value, an integration value, a maximum value, and a minimum value can be used. The driving history is stored in each drive condition as shown by each tab in FIG. 3.

Next, the mileage calculating section 12 is described in detail. The mileage calculating section 12 calculates the mileage in each on the general road and the motor highway, and in each of the four drive conditions. The mileage can be calculated at each time when the drive condition is changed (for example, from the accelerating condition I to the normal driving condition II), or can be calculated at each predetermined time, for example, at each minute.

The mileage is influenced by the inclination of the surface of the road. Therefore, the mileage is corrected by using the inclination of the surface of the road. That is, the mileage is increased at falling gradient driving time and is decreased at rising gradient driving time when the mileage is compared with at flat road driving time. Therefore, the actually detected mileage is corrected to be increased at the rising gradient time and to be decreased at the falling gradient time by multiplying the inclination angle δ by a coefficient. With this, the actually detected mileage can be converted into a mileage at the flat road driving time.

In addition, since the mileage is influenced by laden weight, the mileage is corrected corresponding to the laden weight. For example, when a person other than a driver is detected in a vehicle, the actually detected mileage is multiplied by a coefficient smaller than and the actually detected mileage is converted into a mileage in which the number of persons is one (only the driver).

In the following, the corrected (converted) mileage is used.

Calculation examples of the mileage γ are described.

A mileage γA of a driven period in a drive condition is calculated by "γA=L1_i/Q1_i".

A mileage γB of the drive condition is calculated by "γB=ΣL1_i/Q1_i". The mileage γB is in one of the drive conditions; therefore, the mileage γB of one of the drive conditions can be compared with the mileage γB of another drive condition.

A mileage γC of one travel is calculated as follows: the mileage γC=(L1+L2+L3+L4+ . . . )/(Q1+Q2+Q3+Q4+ . . . ) when an example similar to the example shown FIG. 2 is used.

As described above, the driving history is calculated in each on the general road and the motor highway and is stored in each on the general road and the motor highway.

The calculated mileage is stored in the driver mileage history DB 20 for each driver. In the driver mileage history DB 20, the mileage of each driver is stored in each of the four drive conditions and in the total of the four drive conditions.

Figure 4:
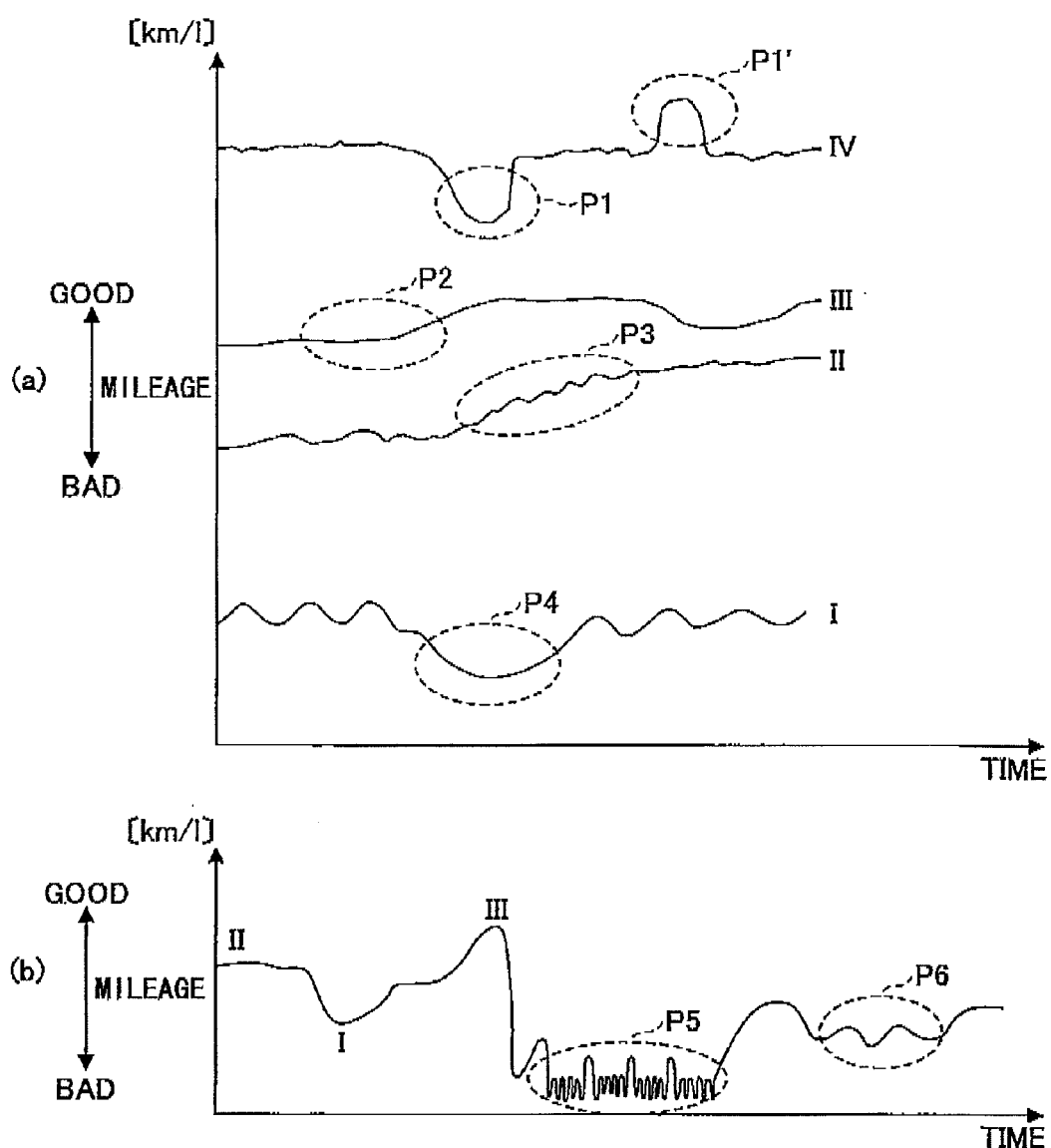
FIG. 4 is a diagram showing examples of a mileage in a time change.

FIG. 4 is a diagram showing examples of a mileage in a time change. In FIG. 4, (*a*) shows an example of the mileage in each of the four drive conditions, and (*b*) shows an example of the mileage in the total of the four drive conditions. As described above, the diagram shown in FIG. 4 is individually formed on the general road and the motor highway. As shown in FIG. 4(*a*), the mileage in the accelerating condition I is the worst, and the mileage in the normal drive condition II is poor. Generally, the mileage in the decelerating condition III and the mileage in the stopping condition. IV are changed depending on the shift position and the idling condition. However, in FIG. 4 (*a*), as an example, the mileage in the stopping condition IV is better than the mileage in the decelerating condition III.

In each of the four drive conditions, the mileage is increased or decreased, and when the driving history is referred to, the drive operation of the driver in each of the four drive conditions which causes to increase or decrease of the mileage can be obtained.

For example, at P1 in the stopping condition IV, the mileage is temporarily decreased; however, when the accelerator position AC and the engine revolutions R are increased, it can be assumed that the decrease of the mileage is caused by racing. In addition, in the stopping condition IV, the mileage is different between the N (neutral) or P (parking) shift position and the D (drive) shift position; therefore, when the change of the mileage and the shift position are referred to, the shift operation to increase the mileage can be obtained.

In addition, at P1' in the stopping condition IV, the mileage is increased. When the engine revolutions R are decreased or zero, or the ignition is OFF in the driving history, this can be assumed that the engine revolutions R are low.

In a vehicle whose fuel injection is electronically controlled, when the accelerator pedal is OFF and the engine revolutions are a predetermined value or more, the fuel supply is automatically stopped (when the shift position is D, 1, or 2).

When an engine brake is operated at the decelerating condition III, the engine revolutions are changed by a variable speed gear. Therefore, in order to stop supplying the fuel to the engine, the variable speed gear is in a state that the engine revolutions are maintained to be high when the engine brake is operated. This state of the variable speed gear influences the mileage at the decelerating condition III.

Therefore, as shown at 22 of FIG. 4 (*a*) in the decelerating condition III, when the mileage is increased, it can be determined whether the engine brake causes to increase the mileage, by referring to the shift position in the driving history.

In addition, for example, at 23 in the normal drive condition II, a tendency of increasing the mileage is detected; however, when the vehicle velocity V is decreased in the normal drive condition II in the driving history, it can be determined that the mileage is increased due to the decrease of the vehicle velocity V. Further, when the vehicle velocity V is approximately constant and the decrease of the engine revolutions R or the change of the shift position (for example, from 2 to D) are detected, it can be determined that the mileage increase is caused by a shift up of the shift position (for example, from 2 to D).

In addition, for example, at P4 in the accelerating condition I, the mileage is temporarily increased after a decrease. When the accelerator position AC and the engine revolutions R are increased in the driving history, it can be determined that the mileage decrease is caused by sudden acceleration.

In FIG. 4(*b*), the plural drive conditions II, I, and III are shown. When the mileage is largely and repeatedly fluctuated as shown at P5, and repetition of starting and stopping of the vehicle is detected in the driving history; it can be determined that the mileage is decreased due to traffic congestion. In addition, when the mileage is slightly fluctuated as shown at P6, and a wavy change of the vehicle velocity V is detected in the driving history; it can be determined that the mileage is decreased due to a wavy drive.

The drive evaluating section 13 evaluates the drive of each driver by referring to the transition of the mileage in the driver mileage history DB 20 and the driving history in the driving history DB 19, and displays advice on the output device 22. The evaluation results are displayed at timing such as when the decrease or the increase of the mileage is detected, when the fuel supply is detected, when the vehicle changes the road from the motor highway to the general road, and when the driver ends the drive at daily or monthly intervals.

In the fuel consumption saving drive supporting device 1 according to the present embodiment, advice is displayed so that the driver can obtain drive operations and driving environment suitable for increasing the mileage. The advice is not only to inform the driver of operations to increase the mileage, but also to inform the driver of operations that cause to decrease the mileage. That is the advice psychologically allows the driver to maintain the highly evaluated drive operations.

When the mileage is increased, an upward inclination appears in each of the four drive conditions in the driver mileage history DB 20. Therefore, the drive evaluating section 13 detects the increase of the mileage and displays the reason of the increase of the mileage. When the drive operation in which the mileage is increased is compared with a previous drive operation, the reason why the mileage is increased can be obtained.

Next, examples of advice to be output from the drive evaluating section 13 corresponding to the driving history and the driver mileage history are described.

When the mileage is decreased in the stopping condition IV as shown at P1 of FIG. 4(*a*) and the mileage decrease is caused by racing, the advice is "racing causes to decrease a mileage, so, reduce the amount of racing". In addition, when the number of racing in a predetermined period (for example, one week) is a predetermined value or more, the advice is "when the amount of racing is great, the mileage is decreased; therefore, reducing the amount of racing is recommended". When the driver obtains the advice, the driver can intend to stop unnecessary racing.

When the mileage is increased in the stopping condition IV as shown at P1' of FIG. 4(a) and the mileage increase is caused by decreasing the engine revolutions, "the mileage is increased by stop idling" is displayed on the output device 22 (and/or output from the speaker) as the advice.

When the mileage is increased in the decelerating condition III as shown at P2 of FIG. 4(a) and the mileage increase is caused by a position shift of a gear during the engine brake, the advice is "the vehicle velocity can be effectively decreased by using the engine brake". By obtaining the advice, the driver can intend to operate the engine brake by operating the position shift from D to 2 or 1 at the decelerating condition III.

When the mileage is increased in the normal drive condition II as shown at P3 of FIG. 4(a) and the mileage increase is caused by decreasing the vehicle velocity V, the advice is "the mileage is increased by decreasing the vehicle velocity".

On the contrary, when the mileage is decreased in the normal drive condition II and the mileage decrease is caused by increasing the vehicle velocity V, the advice is "the mileage is decreased by increasing the vehicle velocity, so, drive at a suitable velocity to increase the mileage". By obtaining the advice, the driver can intend to maintain the driving velocity to be a suitable value, in particular, on a motor highway.

When the mileage is decreased in the accelerating condition I as shown at P4 of FIG. 4(a) and the mileage decrease is caused by a sudden change of the accelerator position AC, the advice is "the mileage is increased when the accelerator is pressed down more slowly". In addition, when the number of the sudden accelerator operations is great, the advice is "when the number of the sudden accelerator operations is decreased, the mileage is increased". By obtaining the advice, the driver can intend to decrease the number of the sudden acceleration operations at starting and driving the vehicle.

When the mileage is decreased due to the traffic congestion as shown at P5 of FIG. 4(b), the advice is "the mileage is decreased due to the traffic congestion; therefore, refrain from using the air conditioner during the drive is recommended". By obtaining the advice, the driver can intend to avoid driving in the traffic congestion and to decrease power consumption in the traffic congestion by refraining from using the air conditioner.

When the mileage is decreased due to the wavy drive as shown at P6 of FIG. 4(b), the advice is "the mileage is increased when the drive is performed at constant velocity". By obtaining the advice, the driver can intend to avoid the wavy drive.

The drive evaluating section 13 calculates, for example, the number of (sudden) braking operations having a predetermined acceleration value (deceleration value) or more in a predetermined distance and/or for a predetermined period in the decelerating condition III by referring to the driving history. When the number of sudden decelerating operations is great, the advice is "when the brake is pressed down more slowly, the vehicle velocity can be efficiently decreased" (the sudden braking operation causes to accelerate excessively). By obtaining the advice, the driver notices that the braking operation has been sudden and the driver can operate the brake more slowly.

In addition, the drive evaluating section 13 calculates, for example, the number of (sudden) accelerating operations having a predetermined acceleration value or more in a predetermined distance and/or for a predetermined period in the accelerating condition I by referring to the driving history. When the number of accelerating operations is small, the advice is "since the number of sudden accelerating operations is small, the mileage is increased". By obtaining the advice, the driver notices the accelerating operations and can pay attention to the accelerating operations.

In addition, when the mileage is a predetermined value or less on a motor highway in the driving history, advice is given to the driver corresponding to a reason of the mileage decrease. For example, when the number of accelerating drives is great on the motor highway in the driving history, the advice is "the mileage is increased when constant velocity driving is performed on a motor highway". In addition, when the vehicle velocity in the accelerating condition I or in the normal driving condition II is too great, the advice is "when the vehicle velocity is too great on the motor highway, the mileage is decreased; therefore, a suitable vehicle velocity is recommended". By obtaining the advice, the driver can intend to drive the vehicle with a constant velocity or a suitable velocity on the motor highway.

In addition, when the idling is continued for a long time at the stopping condition IV (the idling is not stopped while waiting fox a traffic signal change or during parking or stopping of the vehicle). The advice is "when the idling is stopped, the fuel is not consumed". By obtaining the advice, the driver can intend to stop the idling at occasions such as the time waiting for the traffic signal change. In addition, when the shift position is not changed at the stopping condition IV (for example, the shift position stays at D (drive)), the advice is "when the shift position is changed to N (neutral), the fuel consumption can be decreased". By obtaining the advice, the driver can intend to change the shift position to N.

In a case of a manual transmission vehicle, when the engine revolutions R are high and the position of the variable speed gear is low, the advice is "when the engine revolutions R are set to be a value near XXX, the mileage can be increased; and the position of the variable speed gear is recommended to be high while be driving". By obtaining the advice, the driver can intend to change the position of the variable speed gear to a relatively high position.

In addition, the drive evaluating section 13 can give advice to the driver based on a value detected by each of the sensors 30.

When the vehicle height sensor detects that a heavy article has been constantly loaded in the vehicle, the advice is "when an unnecessary article is unloaded, the mileage is increased". By obtaining the advice, the driver can increase the mileage by unloading unnecessary articles such as a golf bag.

In addition, when the air pressure sensor 36 detects that air pressure of a tire is lowered in a low vehicle height, the advice is "the mileage is increased when the air pressure of the tire is set to be a normal value". By obtaining the advice, the driver can increase the air pressure of the tire.

In addition, when the oil deterioration sensor 34 detects deterioration of engine oil, the advice is "the mileage is increased by changing the engine oil". Further, when the oil deterioration sensor 34 detects deterioration of oil for an automatic vehicle, the advice is "the mileage is increased by changing the oil for the automatic vehicle". By obtaining the advice, the driver can increase the mileage by changing the engine oil and/or the oil for the automatic vehicle.

In addition, when the gas sensor 37 detects deterioration of an air cleaner by detecting a large amount of an exhaust gas, the advice is "the mileage is increased by changing the air cleaner". By obtaining the advice, the driver can increase the mileage by changing the air cleaner.

In addition, when the air conditioner ECU 18 detects that the air conditioner is used too often, the advice is "when the temperature of the air conditioner is set to be a value lower (higher) than a current value and the air volume is set to be small, the mileage is increased". By obtaining the advice, the driver can increase the mileage by changing the temperature and/or the air volume of the air conditioner.

FIG. 5 is a diagram showing examples of advice corresponding to drive operations of the driver and drive conditions of the vehicle. The advice has been stored in the advice DB 21 so that the advice is related to the drive operation of the driver. That is, the drive evaluating section 13 detects the drive operation of the driver from the driver mileage history DB 20 and the driving history DB 19, and extracts advice corresponding to the detected drive operation of the driver from the advice DB 21.

The displayed (and/or informed) advice, the drive operation of the driver such as a sudden accelerating operation to which operation the advice is determined to be displayed (informed), and the mileage at the operation are stored in the driving history DB 19 for each driver. When the advice given for drive operation is not detected after passing a predetermined period, the advice (information) is "the drive operation informed before has been improved, and the mileage has been increased". With this, the driver can obtain a message that expressly identifies the driving operation that caused the mileage increase. That is, the mileage can be increased by a learning effect which causes the driver to learn drive operations for increasing the mileage.

Figure 6:
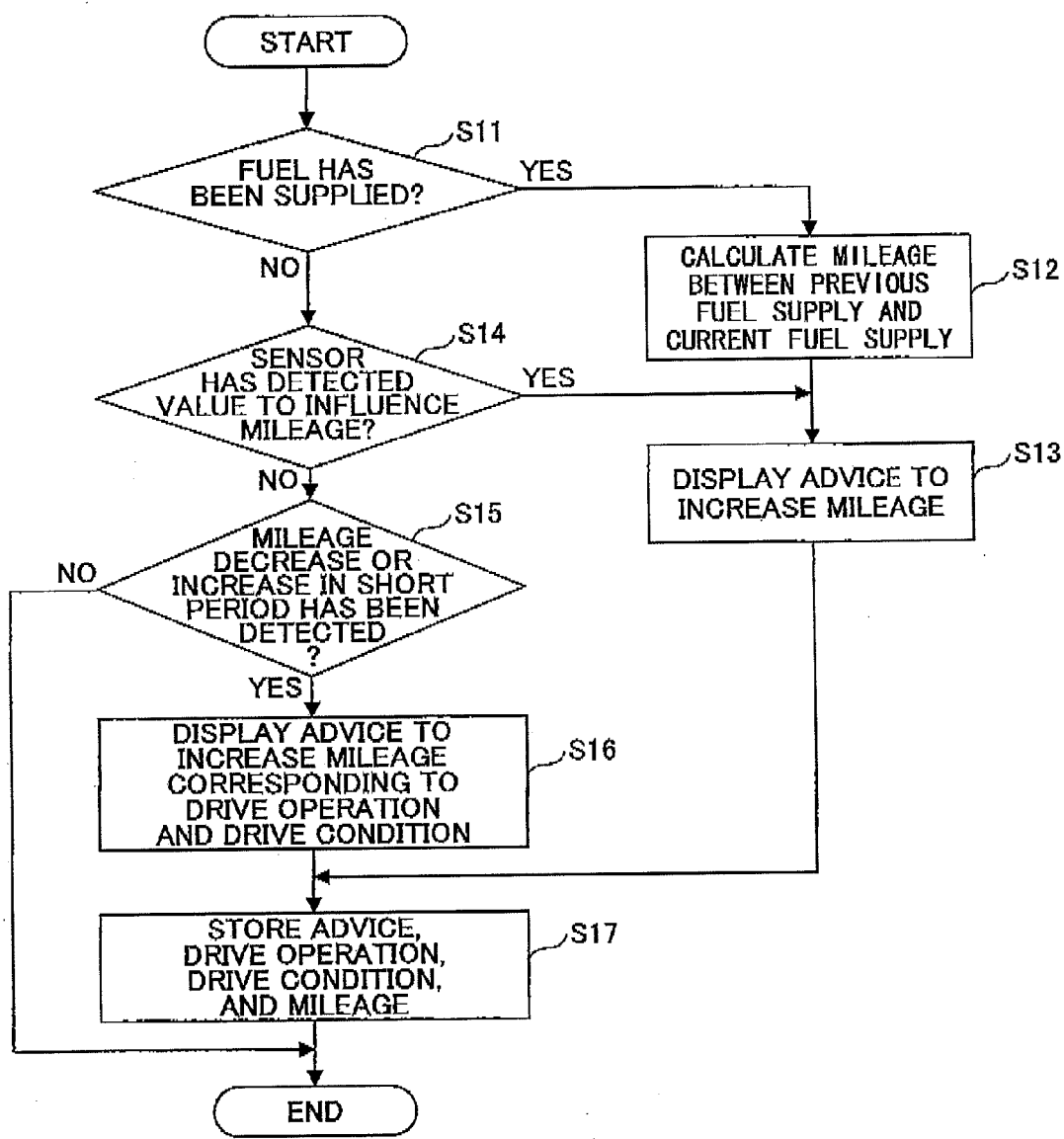
FIG. 6 is a flowchart showing an example of processes to support for increasing the mileage by advice given from the fuel consumption saving drive supporting device according to the embodiment of the present invention.

FIG. 6 is a flowchart showing an example of processes to support for increasing the mileage by advice given from the fuel consumption saving drive supporting device 1 according to the embodiment of the present invention. The processes shown in FIG. 6 start, for example, with a predetermined time interval during the engine operating condition.

First, the mileage information collecting section 11 determines whether fuel has been supplied to a vehicle based on a value detected by the fuel gauge 33 (S11). When fuel has been supplied to a vehicle (YES in S11), the mileage calculating section 12 calculates a mileage between previous fuel supply and current fuel supply (S12). The mileage calculating section 12 calculates a mileage based on a total driven distance and a total consumed amount of fuel, a mileage in each drive on a general road and on a motor highway, and a mileage in each of drive conditions.

The mileage calculated at this time is compared with a mileage at a previous time. When the mileage at this time is increased or decreased, causes of the mileage increase or the mileage decrease are detected in the drive operations and the drive conditions, for example, the increase or the decrease of sudden acceleration, the increase or the decrease of wavy driving, and the increase or the decrease of racing is detected from the driving history; and advice corresponding to the increase or the decrease of the mileage is displayed on the output device 22 (and/or is output from the speaker of the output device 22) (S13). At this time, the mileage at this time and at previous time is preferably displayed on the output device 22. With this, the driver can learn drive operations to increase the mileage based on the advice.

When fuel has not been supplied to a vehicle (NO in S11), the mileage information collecting section 11 determines whether a sensor has detected a value which influences the mileage (S14). When a sensor has detected a value which influences the mileage (YES in S14), advice is displayed based on the value detected by the sensor (S13).

When a sensor has not detected a value which influences the mileage (NO in S14), it is determined whether an increase or a decrease of a mileage in a short period has been detected (S15). An increase or a decrease of a mileage in a short period corresponds to, for example, one of P1 through P6 shown in FIG. 4. When an increase or a decrease of a mileage in a short period has been detected (YES in S15), advice corresponding to the detection is displayed on the output device 22 (and/or is output from the speaker of the output device 22) (S16). That is, the advice in the drive operations and the drive conditions is displayed on the output device 22 (and/or output from the speaker of the output device 22). The transition of the mileage shown in FIG. 4 can be displayed on the output device 22. In addition, a message "the mileage is increased (decreased) by X %" can be displayed on the output device 22.

The mileage information collecting section 11 stores the displayed (and/or informed) advice, the drive operation of the driver and the drive condition of the vehicle corresponding to the advice, and the mileage in the driving history DB 19 (S17). When the advice given drive operation in a drive condition is not detected after passing a predetermined period, a message is displayed (informed) in which the drive operation has been improved.

As described above, the fuel consumption saving drive supporting device 1 according to the embodiment of the present invention can display (inform) various messages which increase a mileage to a driver. Therefore, the driver can obtain specific operations to increase the mileage and intends to maintain drive operations evaluated as good operations. When the mileage has been increased, advice (information) that the mileage has been increased is given to the driver at a drive operation in a drive condition. Therefore, the driver can obtain a drive operation to maintain the mileage increase operation and can perform a drive operation suitable to increase the mileage.

The advice is given to the driver in each of cases of driving on the general road and on the motor highway, and is given by being related to sensors and drive operations of the driver. Therefore, the mileage can be increased in any one of driving occasions. In addition, after giving the advice, it is determined whether the mileage is increased, and determined results are displayed (informed) to the driver. Therefore, the learning effect of the driver can be increased.

Further, the present invention is not limited to the specifically disclosed embodiment, and variations and modifications may be made without departing from the scope of the present invention.

The present invention is based on Japanese Priority Patent Application No. 2006-352006 filed on Dec. 27, 2006, the entire contents of which are hereby incorporated herein by reference.

The invention claimed is:

1. A fuel consumption saving drive supporting device which informs a driver of advice based on an increase or a decrease of a calculated mileage, comprising:
   a detector configured to detect vehicle information related to a drive operation or a drive condition of a vehicle;
   a mileage calculating section configured to calculate a mileage based on the vehicle information and store a history of mileage information on a driver basis and on a drive condition basis;
   a drive evaluating section configured to compare past mileage information recorded at every predetermined time with the current mileage information of the driver, extract the drive operation or the drive condition of the vehicle which leads to a mileage variation, and inform a driver of advice according to the extracted drive operation or drive condition;

wherein if a first advice is informed to the driver due to a deterioration of the mileage, the drive operation and the mileage information related to the deterioration of the mileage are stored; and if the driver operation which induced informing the driver of the first advice is not detected within a predetermined time after the mileage information related to the deterioration of the mileage is detected, the drive evaluating section informs the driver of a second advice which expressly indicates that the driver operation that induced the informing of the first advice, is no longer detected, wherein the second advice is configured to expressly identify the driver operation that induced the informing of the first advice.

2. The fuel consumption saving drive supporting device as claimed in claim 1, wherein:

the mileage is individually calculated in each on a general road and on a motor highway, and the advice is individually informed to the driver in each on the general road and on the motor highway.

3. The fuel consumption saving drive supporting device as claimed in claim 1, wherein:

the drive operation is detected from at least one of a braking operation, a position shifting operation of transmission gears, a vehicle velocity, engine revolutions, and an accelerating and decelerating operation.

4. The fuel consumption saving drive supporting device as claimed in claim 1, wherein:

an informing unit informs the driver of the first advice corresponding to the drive operation which has caused the mileage to decrease based on the drive operation; and when the drive operation which has caused the first advice to be informed to the driver is not detected within the predetermined time, the informing unit informs the driver of the second advice.

5. The fuel consumption saving drive supporting device as claimed in claim 4, wherein:

the drive condition is detected from one or more of an air conditioner operation, oil deterioration information, tire air pressure information, a wearing degree of the tire, an exhaust gas condition, a vehicle height, cooling water temperature, lubrication oil temperature, road inclination, the number of persons in the vehicle, and laden weight on the vehicle; and the informing unit informs the driver of the advice including the drive condition detected when the mileage has been increased or decreased.

* * * * *